(12) United States Patent
Greimel-Längauer et al.

(10) Patent No.: US 11,029,197 B2
(45) Date of Patent: Jun. 8, 2021

(54) OPTICAL SENSOR ARRANGEMENT AND METHOD FOR LIGHT SENSING

(71) Applicant: ams AG, Premstaetten (AT)

(72) Inventors: Bernhard Greimel-Längauer, Premstaetten (AT); Peter Bliem, Premstaetten (AT)

(73) Assignee: ams AG, Premstaetten (AT)

( * ) Notice: Subject to any disclaimer, the term of this patent is extended or adjusted under 35 U.S.C. 154(b) by 23 days.

(21) Appl. No.: 16/626,457

(22) PCT Filed: Jun. 8, 2018

(86) PCT No.: PCT/EP2018/065189
§ 371 (c)(1),
(2) Date: Dec. 24, 2019

(87) PCT Pub. No.: WO2019/011543
PCT Pub. Date: Jan. 17, 2019

(65) Prior Publication Data
US 2020/0225086 A1 Jul. 16, 2020

(30) Foreign Application Priority Data
Jul. 10, 2017 (EP) .................................... 17180507

(51) Int. Cl.
*G01J 1/18* (2006.01)
*G01J 1/46* (2006.01)
*G01J 1/44* (2006.01)

(52) U.S. Cl.
CPC . *G01J 1/18* (2013.01); *G01J 1/46* (2013.01); *G01J 2001/446* (2013.01); *G01J 2001/4426* (2013.01)

(58) Field of Classification Search
CPC ........ G01J 1/18; G01J 1/46; G01J 2001/4426; G01J 2001/446; G01J 2001/444
See application file for complete search history.

(56) References Cited

U.S. PATENT DOCUMENTS 5,303,027 A 4/1994 Kuderer et al.
7,136,005 B1 * 11/2006 Lyden .................... H03M 1/08
341/166

(Continued)

FOREIGN PATENT DOCUMENTS

EP 3 285 051 2/2018

OTHER PUBLICATIONS

European Patent Office, International Search Report for PCT/EP2018/065189, dated Jul. 24, 2018.

*Primary Examiner* — Seung C Sohn
(74) *Attorney, Agent, or Firm* — MH2 Technology Law Group LLP

(57) ABSTRACT

An optical sensor arrangement has an integrator, a photodiode for providing a current corresponding to a first polarity, a comparator coupled to the integrator for comparing a voltage with a threshold voltage to provide a comparison output, a reference charge circuit and a control unit. The reference charge circuit is coupled to the integrator for selectively providing first charge packages of a first size or second charge packages of a second size. The control unit is configured to control operation in a calibration phase, in an integration phase and in a residual measurement phase. During the calibration phase, the reference charge circuit provides one of the first charge packages and one or more of the second charge packages to the integrator until the comparison output changes. A reference number is determined corresponding to a number of the second charge packages provided. During the integration phase, the photodiode is connected to the integrator and the reference charge circuit provides one of the first charge packages to the integrator in response to a respective change of the comparison output. An integration number corresponding to a number of the changes of the comparison output is determined. During the residual measurement phase that (Continued)

immediately follows the integration phase, the reference charge circuit provides one or more of the second charge packages to the integrator until the comparison output changes. A residual number corresponding to a number of the second charge packages provided is determined.

15 Claims, 4 Drawing Sheets

(56) References Cited

U.S. PATENT DOCUMENTS

| | | | |
|---|---|---|---|
| 7,586,168 B2 * | 9/2009 | Raynor | H04N 5/37455 257/431 |
| 2015/0102209 A1 | 4/2015 | Xu et al. | |
| 2015/0326805 A1 | 11/2015 | Scott et al. | |

* cited by examiner

OPTICAL SENSOR ARRANGEMENT AND METHOD FOR LIGHT SENSING

BACKGROUND OF THE INVENTION

The present disclosure is related to an optical sensor arrangement and to a method for light sensing.

An optical sensor arrangement often comprises a photodiode as a light detector and measures a photocurrent flowing through the photodiode. The optical sensor arrangement may convert the photocurrent into a digital signal. For example, the optical sensor arrangement may be realized as a light-to-frequency circuit, also called light-to-frequency machine, abbreviated LTF machine. The LTF circuit may generate the digital signal by integrating the photocurrent and comparing the integrated signal with a threshold. An accuracy of the detected digital signal depends on reference values used during integration and comparison.

SUMMARY OF THE INVENTION

The present disclosure provides an improved concept for light sensing with increased accuracy.

In light-to-frequency conversion, when the photocurrent is integrated, usually each time the integrated signal crosses a threshold value, a well-defined charge package with an opposite polarity compared to the photocurrent is provided to an input of an integrator for setting the integration process to a defined state. This process is repeated during a predefined integration time, and each crossing of the threshold is counted during an integration phase. The accuracy of the count is limited by the size of the well-defined charge package. The improved concept is based on the idea that a second, not necessarily well-defined charge package is used for determining a residual count of such smaller charge packages between the charging state at the end of the integration phase and the corresponding threshold value. Such measurement may be performed in a residual measurement phase that immediately follows the integration phase. However, in order to avoid the requirement of having another well-defined charge package, a relation between the first, well-defined charge package and the second, not well-defined charge packages can be determined by counting an equivalent number of second charge packages to achieve one of the first charge packages. This can be done in a calibration phase. The calibration phase can be performed before an actual measurement, i.e. before an integration phase, or after the integration phase, or even independently from an actual measurement. It may be sufficient to perform the calibration only once for a given series of integration phases.

For example, an embodiment of an optical sensor arrangement according to the improved concept comprises an integrator with an integrator input and an integrator output, a photodiode for providing a current corresponding to a first polarity, and a comparator with a comparator input coupled to the integrator output. The comparator is configured to compare a voltage at the comparator input with a threshold value for providing a comparison output. A reference charge circuit is coupled to the integrator input for selectively providing first charge packages of a first size or second charge packages of a second size, wherein the first charge packages correspond to a second polarity being opposite of the first polarity and the second charge packages correspond to the first polarity. For example, the second charge packages are smaller than the first charge packages.

In this context, polarity defines the sign of charges provided by the respective elements. For example, the second charge packages correspond to a current having the same polarity as a current provided by the photodiode.

A control unit of the optical sensor arrangement is configured, during a calibration phase, to control the reference charge circuit to provide one of the first charge packages to the integrator input and to provide one or more of the second charge packages to the integrator input until the comparison output changes. The control unit further determines a reference number corresponding to a number of the second charge packages provided during said calibration phase. During the calibration phase, the control unit may have the photodiode disconnected from the integrator input. The disconnection may achieve that the reference number is not influenced by a photocurrent during counting. However, in some implementations or configurations, the control unit may also be configured to keep the photodiode connected to the integrator input during the calibration phase, e.g. if the photocurrent is negligible and/or if switching the photodiode would cause a non-negligible current contribution. For example, the calibration phase is short with respect to the time of a regular integration phase.

The control unit is further configured, during an integration phase, to connect the photodiode to the integrator input, to control the reference charge circuit to provide one of the first charge packages to the integrator input in response to a respective change of the comparison output and to determine an integration number corresponding to a number of said change of the comparison output. Accordingly, for each crossing of the threshold value at the integrator output, one of the first charge packages is provided and increases a detected number of pulses during the integration phase.

The control unit is further configured, during a residual measurement phase that immediately follows the integration phase, to control the reference charge circuit to provide one or more of the second charge packages to the integrator input until the comparison output changes, and to determine a residual number corresponding to a number of the second charge packages provided during the residual measurement phase. The residual number, so to speak, corresponds to what is missing to reach the threshold value when no current is provided from the photodiode after its disconnection from the integrator input.

The control unit may further be configured to disconnect the photodiode from the integrator input during the residual measurement phase. The disconnection may achieve that the residual number is not influenced by a photocurrent during counting. However, in some implementations or configurations, the control unit may also be configured to keep the photodiode connected to the integrator input during the residual measurement phase, e.g. if the photocurrent is negligible and/or if switching the photodiode would cause a non-negligible current contribution. For example, the residual measurement phase is short with respect to the time of the integration phase.

A reason why the finer charge package of the second size is not used for the normal integration is that this charge is not trimmed and not well defined over temperature and process. During the calibration phase, the not well defined charge of the second size is calibrated to the charge package of the first size.

For example, the control unit is configured to provide a total integration value based on the integration number and a ratio of the residual number and the reference number. For example, the total integration value may consist of an integer value corresponding to the integration number and a fractional value corresponding to a ratio of the difference between the reference number and the residual number, in relation to the reference number.

For example, the following equation gives the fractional residual, i.e. the missing second charge packages, calibrated to the reference charge, i.e. the first charge packages:

$$\text{Residual} = \frac{(\text{reference number} - \text{residual number})}{\text{reference number}}$$

Hence, the accuracy of the total integration value formed from the measurements made during the integration phase and the residual measurement phase is improved to the size of the second, smaller charge package. With this concept, it is possible that e.g. an ALS measurement within a given integration time is further improved, which is advantageous while dealing with very low light conditions, e.g. for applications where the sensor is mounted behind ink in a mobile phone display.

In various embodiments, the integration phase starts with providing one of the charge packages to the integrator input.

In some implementations, the control unit is configured, during an initialization phase that immediately precedes the integration phase, to preset the integrator input to a voltage corresponding to the threshold value with a tolerance corresponding to less than the second size. Accordingly, with the defined starting point, the accuracy of the overall measurement process can be further increased.

For example, the control unit is configured to preset the integrator input during the initialization phase by charging an integration capacitor of the integrator to the threshold value. Hence, no current from the photodiode is lost at the beginning of the integration phase.

In an alternative implementation, the control circuit is configured to preset the integrator input during the initialization phase by controlling the reference charge circuit to provide one or more of the first charge packages to the integrator input until the comparison output changes a first time, and controlling the reference charge circuit to provide one or more of the second charge packages to the integrator input until the comparison output changes a second time.

Accordingly, from an undefined starting point, first charge packages are provided to the integrator input until the threshold value is crossed a first time. Then, the second charge packages having the opposite polarity are provided until the threshold value is crossed again, obviously in the opposite direction. Accordingly, with the second crossing of the threshold voltage, the integrator input assumes a value that is less away from the threshold value than a voltage corresponding to the second size of the second charge packages.

The generation, respectively provision, of the first and second charge packages can be implemented in several ways. For example, a single capacitor can be used that is charged with two different reference voltages such that two different amounts of charge are stored on a capacitor depending on the respective requirements. In an alternative, two different capacitors are used that are charged with the same or different reference voltages. In each case, two different amounts of charge can be controlled to be provided to the integrator input in a switched fashion.

For example, the reference charge circuit comprises a reference capacitor, e.g. a single reference capacitor. For providing the first charge package, the reference capacitor is charged with a first reference voltage while the reference capacitor is disconnected from the integrator input. After the charging, the reference capacitor is connected to the integrator input such that the amount of charge can be transferred to the integrator input. For providing the second charge package, in a similar fashion, the reference capacitor is charged with a second reference voltage while the reference capacitor is disconnected from the integrator input. After the charging the reference capacitor is connected to the integrator input for providing the stored charge.

In an alternative implementation, the reference charge circuit comprises a first and a second reference capacitor. For providing the first charge package, the first reference capacitor is charged with a first reference voltage while the first reference capacitor is disconnected from the integrator input. After the charging the first reference capacitor is connected to the integrator input. For providing the second charge package, the second reference capacitor is charged with the first reference voltage or with the second reference voltage while the second reference capacitor is disconnected from the integrator input. After the charging, the second reference capacitor is connected to the integrator input.

For example, the charging and discharging, respectively providing, the stored charge to the integrator input, may be controlled by respective switching signals provided by the control unit. Moreover, the charging and the provision of the first and second charge packages may be based on a reference clock signal. Hence, a defined timing is achieved allowing stable operation.

In some implementations, a clock speed of the reference clock signal can be reduced during the calibration phase and/or the residual measurement phase, in particular compared to the integration phase. This allows better settling of an amplifier that may be employed in the integrator.

In some implementations an amplifier of the integrator is operated in a lower noise mode of operation during the calibration phase and/or the residual measurement phase, in particular compared to the integration phase. This may further increase the accuracy achieved when operating the arrangement with the second charge packages.

As the amplifier can be forced into a low noise mode during the residual measurement phase, for example by lowering the bandwidth of the amplifier and/or slowing down clock frequencies, settling of the system is allowed, without having an impact on the dynamic range during normal integration time.

In some implementations the control unit is configured to enter the calibration phase more than once, and to determine a mean value from the respective reference numbers determined in each of said calibration phases. The mean value can then be used as a final reference number. Accordingly, the ratio between the second charge packages and the first charge packages, respectively their sizes, can be determined with a higher certainty. This further improves the accuracy of the overall measurement.

In the various implementations described above, the first size of the first charge package may be trimmed while the second size of the second charge package is not trimmed. Hence, as only one of the charge packages has to be trimmed, the effort for having well-defined charge packages is reduced.

In various configurations of such arrangement, where the photodiode is connected to and disconnected from the integrator input, the switching process may provide additional current to the integrator input that can have influence on the measurement result, for example during the residual measurement phase and the calibration phase.

To this end, the improved concept optionally introduces an ON-OFF-compensation phase during which the effects of connecting and disconnecting the photodiode are measured. For example, during such ON-OFF-compensation phase, the control unit controls the reference charge circuit to provide one of the first charge packages to the integrator input. Then the control unit first connects and then disconnects the photodiode to respectively from the integrator input, which may result in an ON-OFF error. Then the control unit controls the reference charge circuit to provide one or more of the second charge packages to the integrator input until the comparison output changes. The control unit determines an ON-OFF number corresponding to the number of second charge packages provided.

The ON-OFF-compensation phase may be implemented as a combination of a short integration phase that only allows switching on and off of the photodiode, together with a residual measurement phase, which provides the ON-OFF number in this case.

A difference between the reference number of the calibration phase and the ON-OFF number of the ON-OFF-compensation phase corresponds to the ON-OFF error. This numerical representation of the ON-OFF error can be taken into account when providing the total integration value, which then is further based on the ON-OFF number respectively the ON-OFF error.

It has further been found that also internal states like leakage currents can influence the measurement result. To take such internal states like leakage currents into account, the improved concept proposes to measure the leakage currents over a predefined time in terms of second charge packages. The term leakage current is used in the following for summarizing any additional currents appearing at the integrator input. For example, the leakage current can be integrated for a full integration time respectively a regular integration phase, or a defined portion of such integration time. During such integration, the photodiode may be disconnected from the integrator input, or the photodiode may be connected without being exposed to light. By disconnecting the photodiode, only internal states resulting from e.g. the electronics can be taken into account.

For example, the integration of the leakage current may be performed during a leakage integration phase. After the leakage integration phase, a leakage compensation phase may be started that more or less corresponds to a residual measurement phase. Accordingly, the control unit controls the reference charge circuit to provide one or more of the second charge packages until the comparison output changes, and determines a leakage number corresponding to the number of second charge packages provided during the leakage compensation phase.

A difference between the reference number of the calibration phase and the leakage number of the leakage compensation phase corresponds to an internal error. This numerical representation of the internal error can be taken into account when providing the total integration value, which then is further based on the leakage number respectively the internal error. For instance, if the leakage integration phase has the same length as a regular integration phase, the difference value between the reference number and a leakage number can be directly used, assuming that the same leakage current would have been provided during a regular integration phase. However, if the leakage integration phase only lasts a portion of the regular integration phase, e.g. half the time, the difference should be formed from the leakage number multiplied with the ratio between regular integration time and the time of the leakage integration phase, which is two in the present example.

In order to be able to consider as well positive as negative leakage currents, one or more of the first charge packages could be provided to the integrator input during the leakage integration phase, e.g. at the beginning of the leakage integration phase. Such first charge packages apparently have to be considered when determining the leakage number.

An arrangement according to one of the embodiments described above can be used, for example in a mobile device, e.g. a mobile phone, e.g. for ambient light sensing. The improved concept e.g. allows an accurate measurement even under low lighting conditions where only a small photocurrent is provided by a photodiode.

The present disclosure also relates to a light sensing method according to the improved concept. Such a method may be performed with an arrangement having a photodiode providing a current corresponding to a first polarity, an integrator with an integrator input and integrator output, and a comparator with a comparator input coupled to the integrator output, the comparator being configured to compare a voltage at the comparator input with a threshold value for providing a comparison output. The method comprises a calibration phase, an integration phase and a residual measurement phase.

During the calibration phase, the photodiode may be disconnected from the integrator input, one of first charge packages of a first size is provided to the integrator input, and one or more of second charge packages of a second size are provided to the integrator input until the comparison output changes. A reference number corresponding to a number of the second charge packages is provided, wherein the first charge packages correspond to a second polarity being opposite of the polarity and the second charge packages correspond to the first polarity.

During the integration phase, the photodiode is connected to the integrator input, one of the first charge packages is provided to the integrator input in response to a respective change of the comparison output and an integration number corresponding to a number of said changes of the comparison output is determined.

During the residual measurement phase that immediately follows the integration phase, the photodiode may be disconnected from the integrator input, one or more of the second charge packages are provided to the integrator input until the comparison output changes, and a residual number corresponding to a number of the second charge packages is determined.

The light sensing method may further comprise an initialization phase that immediately precedes the integration phase. During such an initialization phase, the integrator input is preset to a voltage corresponding to the threshold value with a tolerance corresponding to less than the second size.

Further implementations of the method become directly apparent for the skilled person from the various embodiments and implementations described above for the optical sensor arrangement.

In some implementations of the optical sensor arrangement and the light sensing method, calibration of the second charge packages with respect to the first charge packages, and performing of the residual measurement can be omitted, while the second charge packages are used for presetting the integrator input during the initialization phase. For example, the initialization phase can be performed both with calibrated second charge packages and non-calibrated second charge packages.

For example, a corresponding embodiment of an optical sensor arrangement comprises an integrator with an integrator input and an integrator output, a photodiode for providing a current corresponding to a first polarity, and a comparator with a comparator input coupled to the integrator output. The comparator is configured to compare a voltage at the comparator input with a threshold value for providing a comparison output. A reference charge circuit is coupled to the integrator input for selectively providing first charge packages of a first size or second charge packages of a second size, wherein the first charge packages correspond to a second polarity being opposite of the first polarity and the second charge packages correspond to the first polarity. The second charge packages are smaller than the first charge packages.

The control unit is configured, during an initialization phase that immediately precedes an integration phase, to preset the integrator input by controlling the reference charge circuit to provide one or more of the first charge packages to the integrator input until the comparison output changes a first time, and controlling the reference charge circuit to provide one or more of the second charge packages to the integrator input until the comparison output changes a second time.

With respect to the integration phase, it is referred to the description above.

Accordingly, from an undefined starting point, first charge packages are provided to the integrator input until the threshold value is crossed a first time. Then, the second charge packages having the opposite polarity are provided until the threshold value is crossed again, obviously in the opposite direction. Accordingly, with the second crossing of the threshold voltage, the integrator input assumes a value that is less away from the threshold value than a voltage corresponding to the second size of the second charge packages. Hence a more accurate starting value for the integration phase can be achieved.

BRIEF DESCRIPTION OF THE DRAWINGS

The following description of figures of example embodiments may further illustrate and explain aspects of the improved concept. Devices and circuit parts with the same structure and the same effect, respectively, appear with equivalent reference symbols. In so far as devices or circuit parts correspond to one another in terms of their function in different figures, the description thereof is not repeated for each of the following figures.

In the drawings.

DETAILED DESCRIPTION

Figure 1:
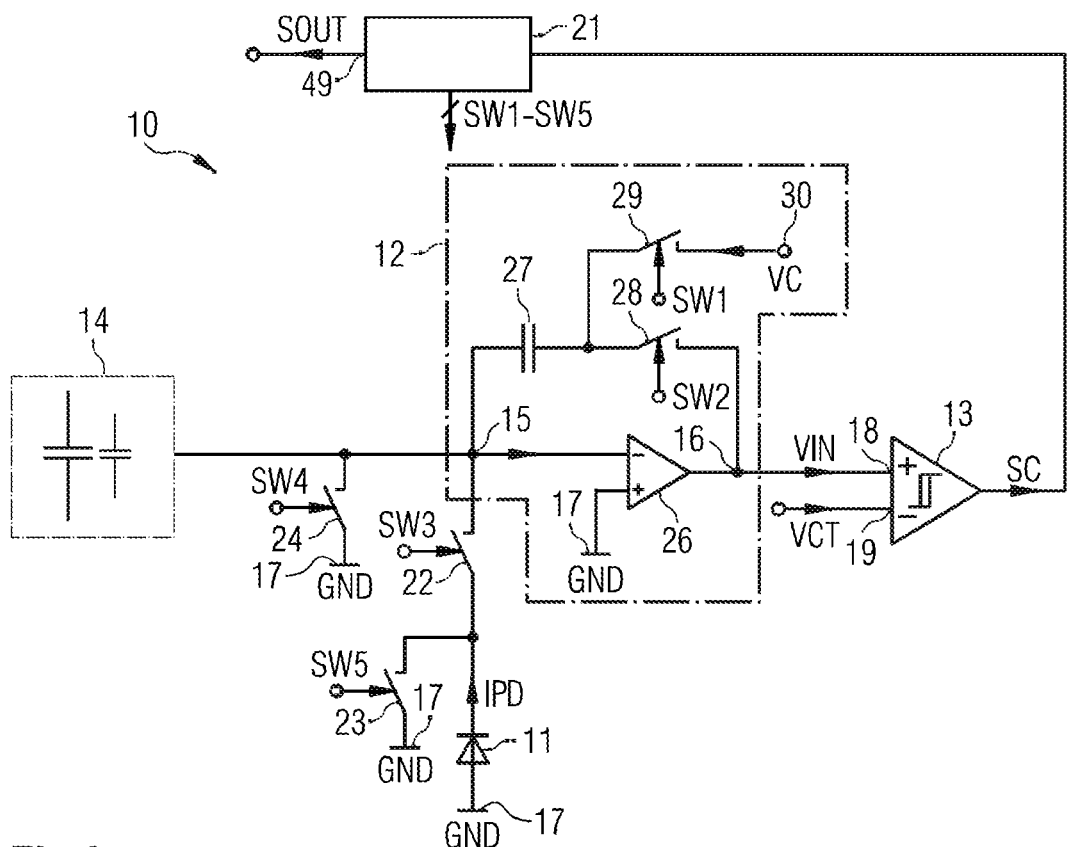
FIG. 1 shows an example implementation of an optical sensor arrangement according to the improved concept.

FIG. 1 shows an example embodiment of an optical sensor arrangement 10 comprising a photodiode 11, an integrator 12, a comparator 13 and a reference charge circuit 14. Arrangement 10 may be used as an LTF machine 10.

In FIG. 1, a simple block diagram of the LTF machine 10 is illustrated. The integrator 12 comprises an integrator input 15 and an integrator output 16. The integrator input 15 is coupled to the photodiode 11. The integrator output 16 is connected to a comparator input 18 of the comparator 13. Moreover, the optical sensor arrangement 10 comprises a control circuit 21 having an input coupled to an output of the comparator 13.

The optical sensor arrangement 10 comprises a first switch 22 that is arranged between the photodiode 11 and the integrator input 15. An anode of the photodiode 11 is connected to a reference potential terminal 17. A cathode of the photodiode 11 is coupled via the first switch 22 to the integrator input 15. Moreover, the optical sensor arrangement 10 comprises a second switch 23 that couples the photodiode 11 to the reference potential terminal 17. Thus, the second switch 23 couples a node between the first switch 22 and the photodiode 11 to the reference potential terminal 17. Additionally, a de-charging switch 24 is arranged between the integrator input 15 and the reference potential terminal 17.

Hence the photodiode 11 provides a photocurrent IPD of a first polarity to the integrator input 15.

The integrator 12 comprises an amplifier 26 and an integration capacitor 27. An input of the amplifier 26 is directly connected to the integrator input 15. An output of the amplifier 26 is directly connected to the integrator output 16. The input of the amplifier 26 may be realized as an inverting input. A further input of the amplifier 26 is connected to the reference potential terminal 17. The further input of the amplifier may be realized as a non-inverting input. A first electrode of the integration capacitor 27 is connected to the integrator input 15 and thus to the input of the amplifier 26. A second electrode of the integrator capacitor is coupled to the output of the amplifier 26 and thus to the integrator output 16.

The integrator 12 comprises an integrator switch 28. The integrator switch 28 couples the second electrode of the integrator capacitor 27 to the output of the amplifier 26 and thus to the integrator output 16. A node between the integration capacitor 27 and the integrator switch 28 is coupled via a further integrator switch 29 to a voltage terminal 30. For example, the voltage terminal 30 may be connected to a second input 19 of the comparator 13.

Outputs of the control circuit 21 are connected to the control terminals of the first switch 22, the second switch 23, the de-charging switch 24, the integrator switch 28 and the further integrator switch 29. Moreover, the control circuit 21 comprises a signal output 49.

A comparator threshold voltage VCT is applied to the second input 19 of the comparator 13. The comparator threshold voltage VCT sets a comparator switching point of the comparator 13. The comparator threshold voltage VCT may be equal to the comparator switching point. The comparator 13 generates a comparator signal SC. The comparator signal SC may be implemented as a light-to-frequency output signal. The comparator signal SC is provided to the control circuit 21. The control circuit 21 generates an output signal SOUT at the signal output 49 as a function of the comparator signal SC. The control circuit 21 generates switch control signals SW1 to SW5 and provides said control signals to the control terminals of the switches 22 to 24, 28, 29.

A terminal voltage VC can be tapped at the voltage terminal 30 and is applied to the further integrator switch 29. A not-shown voltage source may be connected to the voltage terminal 30 and may generate the terminal voltage VC. The voltage source may also be connected to the second input 19 of the comparator 13. In this case, the terminal voltage VC may be equal to the comparator threshold voltage VCT.

A reference potential GND can be tapped at the reference potential terminal 17. The reference potential GND is provided to the further input of the amplifier 26.

A comparator input voltage VIN can be tapped at the integrator output 16 and, thus, at the first input 18 of the comparator 13. The comparator signal SC is a function of the difference between the comparator input voltage VIN and the comparator threshold voltage VCT. If the comparator input voltage VIN is higher than the comparator threshold voltage VCT, then the comparator 13 generates the comparator signal SC with a first logical value.

The comparator threshold voltage VCT may be different from the terminal voltage VC.

The reference charge circuit 14 that is coupled to the integrator input 15 is configured to selectively providing first charge packages of a first size or second charge packages of a second size. The first charge packages correspond to a second polarity being opposite of the first polarity of the current provided by the photodiode. The second charge packages correspond to said first polarity. The provision of first and second charge packages is controlled by the control unit 21. Moreover, the generation of the charge packages within the reference charge circuit 14 can also be controlled by the control unit 21, which will be explained later in more detail in conjunction with FIG. 3 and FIG. 4.

The control unit 21 can have the optical sensor arrangement 10 to be operated in different operation phases. For example, during an integration phase, the control unit 21 connects or keeps connected the photodiode 11 to the integrator input 15, controls the reference charge circuit 14 to provide one of the first charge packages to the integrator input in response to a respective change of the comparison output SC and determines an integration number corresponding to a number of said changes of the comparison output SC. For example, the number of changes is counted by a counter within the control unit 21.

According to the improved concept, to also cover a residual between a voltage at the integrator input at the end of the integration phase and the threshold value VCT, the control unit 21, during a residual measurement phase that immediately follows the integration phase, controls the reference charge circuit 14 to provide one or more of the second charge packages to the integrator input 15 until the comparison output changes. The control unit 21 determines a residual number corresponding to a number of said second charge packages provided during the residual measurement phase. The control unit 21 e.g. disconnects the photodiode 11 from the integrator input 15 during the residual measurement phase. However, in some implementations or configurations, the control unit 21 may also keep the photodiode 11 connected to the integrator input 15 during the residual measurement phase, e.g. if the photocurrent is negligible and/or if switching the photodiode 11 would cause a non-negligible current contribution. For example, the residual measurement phase is short with respect to the time of the integration phase.

A ratio between the second size of the second charge packages and the first size of the first charge packages is determined in a calibration phase, during which the photodiode e.g. is disconnected from the integrator input. In the calibration phase the control unit controls the reference charge circuit to provide one of the first charge packages to the integrator input 15 and to provide one or more of the second charge packages to the integrator input 15 until the comparison output SC changes. The control unit 21 determines a reference number corresponding to a number of the second charge packages provided. However, in some implementations or configurations, the control unit 21 may also keep the photodiode 11 connected to the integrator input 15 during the calibration phase, e.g. if the photocurrent is negligible and/or if switching the photodiode 11 would cause a non-negligible current contribution. For example, the calibration phase is short with respect to the time of the integration phase.

Figure 2:
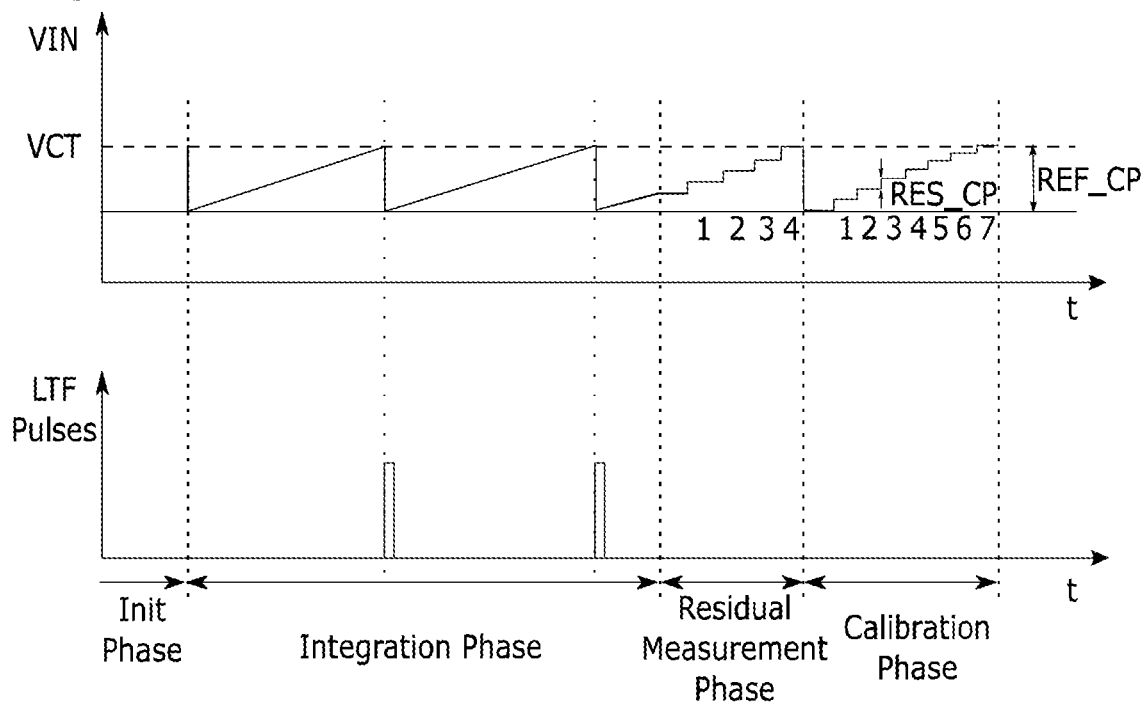
FIG. 2 shows an example signal diagram of signals in the arrangement of FIG. 1.

Referring now to FIG. 2, the different operational phases will be explained in more detail with the aid of an example signal diagram. In this example diagram it is assumed that at the end of an initialization (INIT) phase the integrator 12 is preset such that the signal VIN at the integrator output 16, respectively the comparator output 18, assumes the threshold voltage VCT. At the beginning of the integration phase, that immediately follows the INIT phase, a first charge package is provided to the integrator input 15 resulting in voltage step, in this example a negative voltage step, of the size REF_CP. The voltage VIN increases with provision of the photocurrent IPD to the integrator input 15 until the threshold voltage VCT is reached, respectively crossed. In response to this event, an LTF pulse is generated, as can be seen on the lower part of the diagram. Concurrently, a first charge package is provided to bring the voltage VIN down again. The photocurrent of the still connected photodiode 11 further increases the voltage VIN, repeating the abovementioned process.

It should be noted that the two LTF pulses depicted in the example diagram of FIG. 2 are only used for easier illustration of the concept, while in practical implementations, depending on an actual photocurrent, many more integration pulses will be generated during a predefined integration phase, or even a single LTF pulse. For example, such an integration phase is determined by a 50 Hz or 60 Hz signal.

At the end of the integration phase, which is a start of the residual measurement phase, the voltage VIN is somewhere between a voltage VCT−REF_CP and VCT, forming a residual voltage. Hence, according to the improved concept, second charge packages of a second size corresponding to a voltage RES_CP are provided from the reference charge circuit 14 to the integrator input 15 under control of the control unit 21 until the threshold voltage VCT is reached or crossed. In this example, four packages are needed for crossing the threshold voltage VCT. This number is stored as the residual number. Hence, the integration number and the residual number allow a more accurate representation of the intensity of the photocurrent, respectively the light inducing the photocurrent.

In order to better quantify the residual number, a ratio between the second size corresponding to a voltage step RES_CP and the first size corresponding to the voltage steps REF_CP is determined in the calibration phase, which in this example follow the residual measurement phase. However, the calibration phase could also be performed before the initialization phase or completely independent from an actual measurement.

As can be seen from FIG. 2, a first charge package is provided to the integrator input 15 at the beginning of the calibration phase and several second charge packages are provided afterwards until the threshold value VCT is reached or crossed. In this example, seven second charge packages correspond to one of the first charge packages.

Figure 3:
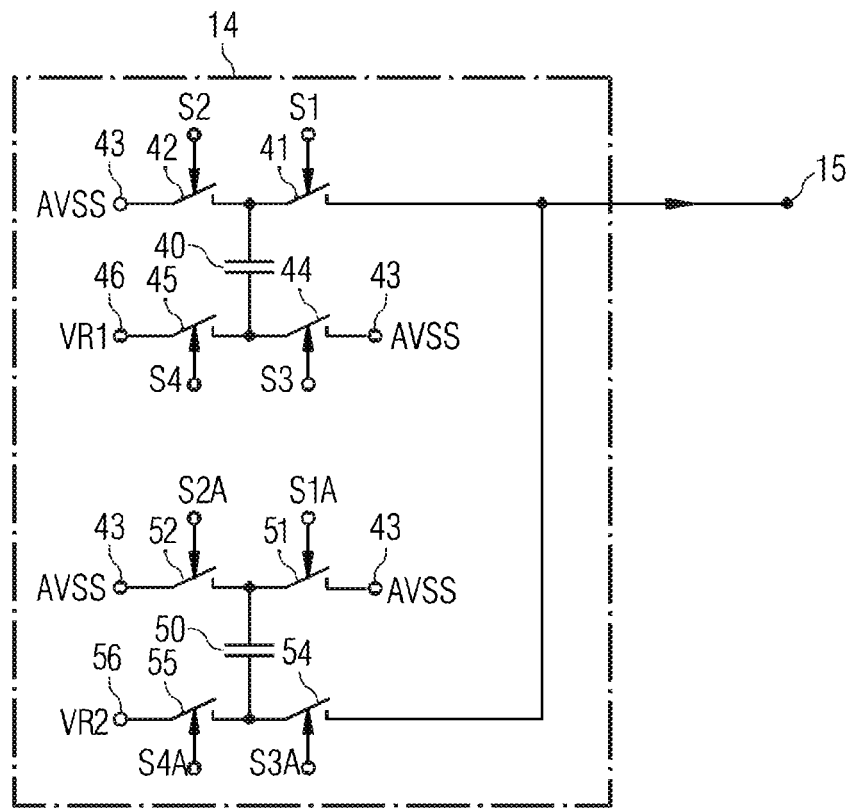
FIG. 3 shows an example implementation of a reference charge circuit according to the improved concept.
Figure 4:
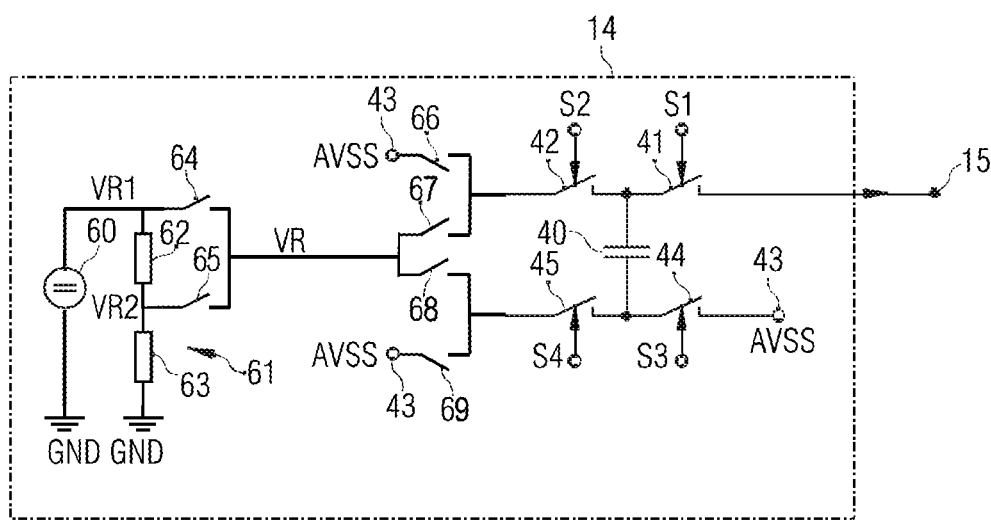
FIG. 4 shows another example embodiment of a reference charge circuit according to the improved concept.

FIG. 3 and FIG. 4 show example implementations of a reference charge circuit 14 for providing the charge packages of the first and second size.

In the embodiment of FIG. 3, the reference charge circuit 14 comprises a first reference capacitor 40 having a first and a second electrode. A first reference switch 41 of the reference charge circuit 14 couples the first electrode of the first reference capacitor 40 to the integrator input 15. A second reference switch 42 couples the first electrode of the first reference capacitor 40 to a reference terminal 43. Moreover, the reference charge circuit 14 comprises a third reference switch 44 coupling the second electrode of the first reference capacitor 40 to the reference terminal 43.

Furthermore, a fourth reference switch 45 of the reference charge circuit 14 couples the second electrode of the first reference capacitor 40 to a reference source terminal 46.

A reference signal AVSS is provided to the reference terminal 43. The reference signal AVSS may be equal to the reference potential GND. A first reference voltage VR1 is provided at the reference source terminal 46.

In a similar fashion, the reference charge circuit 14 also comprises a second reference capacitor 50 having a first and a second electrode. A corresponding reference switch 51 couples the first electrode of the second reference capacitor 50 to the reference terminal 43. Furthermore, switch 52 couples the first electrode of capacitor 50 to the reference terminal 43, switch 55 couples a second terminal of capacitor 50 to a second reference source terminal 56, at which a second reference voltage VR2 is provided. A switch 54 couples the second electrode of the second reference capacitor 50 to the integrator input 15.

For example under control of control circuit 21, respective switching signals are provided to the reference charge circuit 14 for charging and discharging the first and the second reference capacitor 40, 50, wherein the discharging corresponds to the actual provision of the respective charge package to the integrator input 15.

FIG. 4 shows a second embodiment of the reference charge circuit which uses only one reference capacitor 40 for generating both the first and the second charge packages. In particular, the circuit around the first reference capacitor 40 together with switches 41, 42, 44, 45 and reference connections 43 and 46 correspond to the embodiment shown in FIG. 3.

The first reference voltage VR1 is provided by a reference source 60 connected between terminal 46 and the reference potential terminal 17. The reference so 60 may be realized as a reference voltage source, e.g. as a band gap circuit. A reference source divider 61 couples the reference source 60 to the reference potential terminal GND and comprises two divider resistors 62, 63. A tap of the reference source divider 61 is between the two divider resistors 62, 63 and provides a second reference voltage VR2. The second reference voltage VR2 is hence smaller than the first reference voltage VR1. Switches 64, 65 provide either the first reference voltage VR1 or the second reference voltage VR2 as a resulting reference voltage VR.

Further switches 66, 67, 68 and 69 together act as a polarity switch for providing either the reference signal AVSS or the resulting reference voltage VR to switches 42, 45, respectively the capacitor 40. For example, referring to the implementation of FIG. 3, for achieving the upper circuit parts for providing the first reference voltage VR1, switches 64, 66 and 68 are closed while switches 65, 67 and 69 are open. For providing the second reference voltage VR2, the switching states are inverted, such that switches and 64, 66 and 68 are open while switches 65, 67 and 69 are closed.

The charge packages that result from the embodiments shown in FIG. 3 and FIG. 4 depend on the charging voltage, i.e. the reference voltage VR1 and/or the reference voltage VR2, and the respective capacitance values of the reference capacitors 40, respectively 50. For example, in both embodiments, the first charge package corresponds to a charge value $Q1=VR1 \cdot CREF1$, wherein CREF1 is the capacitance value of the reference capacitor 40.

In the embodiment of FIG. 3, the second charge package has a charge value $Q2=VR1 \cdot CREF2$, wherein CREF2 is the capacitance value of the reference capacitor 50. In the embodiment of FIG. 4, the second charge package has a charge value $Q2=VR2 \cdot CREF1$. For the embodiment of FIG. 3, the second reference capacitor 50 can also be charged with the first reference voltage VR1, as the different charge package can result from the different capacitance value.

As indicated earlier, the improved concept aims at presetting the integrator input such that it more or less coincides with the threshold value VCT during an initialization phase immediately preceding the integration phase. In particular, a difference between the starting voltage and the threshold voltage VCT should be smaller than a voltage corresponding to the second size of the second charge package.

Figure 5:
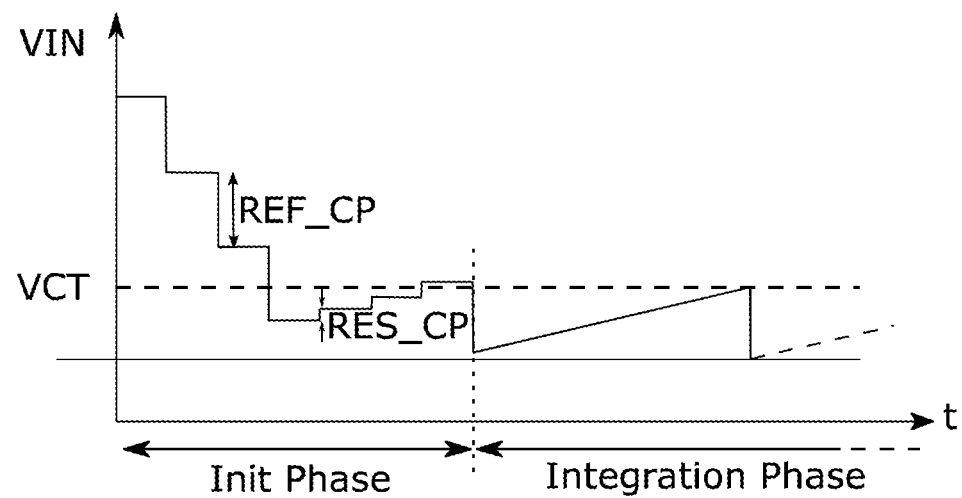
FIG. 5 shows a further example signal diagram of signals in the arrangement of FIG. 1.

Turning now to FIG. 5, a signal diagram is shown demonstrating an example implementation of how to achieve the desired initialization. In this example, starting from an arbitrary starting value that is higher than the threshold value VCT, one or more of the first charge packages, corresponding to the voltage step REF_CP are provided to the integrator input 15 until the threshold voltage VCT is crossed, i.e. a first time. Then, one or more of second charge packages corresponding to a voltage step RES_CP having the opposite polarity are provided to the integrator input 15 until the comparison output SC changes a second time. As before the last of the second charge packages the voltage VIN is below the threshold value VCT, the voltage VIN can be only one of the second charge packages higher, i.e. one voltage step RES_CP higher than the threshold voltage VCT afterwards. Hence, the starting point for the integration phase that immediately follow the initialization phase is more accurately defined. For example, at the beginning of the integration phase, one of the first charge packages corresponding to the voltage step REF_CP is provided to the integrator input 15 reducing an error at the start of the integration phase.

It should be noted that the initialization described in conjunction with FIG. 5 does not necessarily depend on the calibration of the second charge packages with respect to the first charge packages. Hence, such initialization can be performed before a measurement phase, respectively integration phase, independent of the kind of integration performed, i.e. also without a residual measurement phase.

Figure 6:
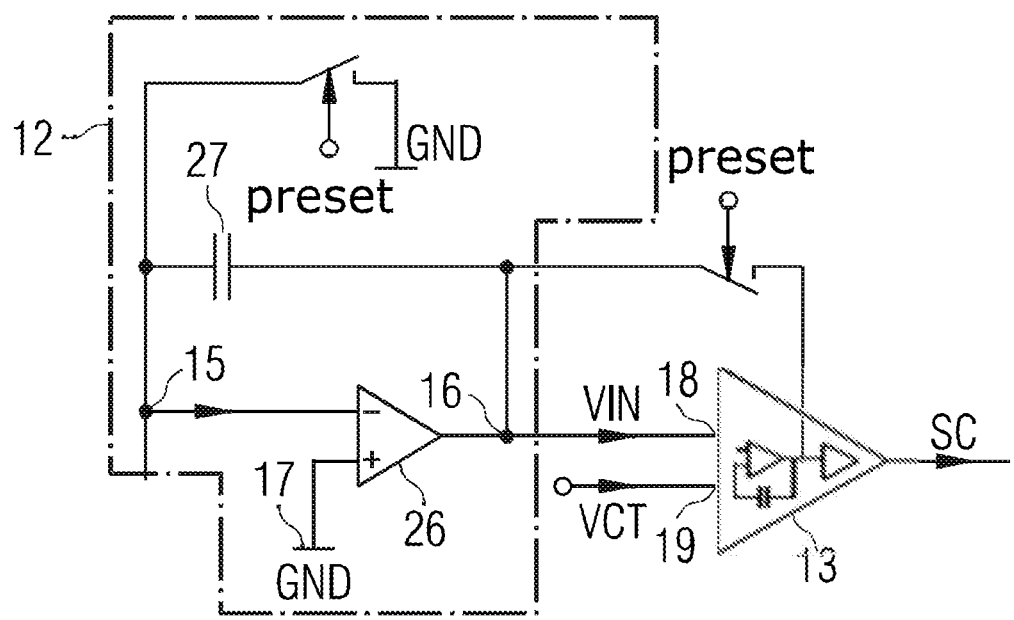
FIG. 6 shows an example detail of an optical sensor arrangement according to the improved concept.

Referring now to FIG. 6, a detail of the optical sensor arrangement in a possible implementation is shown. For example, a first terminal of the integration capacitor 27 is connected to the ground terminal via a first switch, while the second terminal of the integration capacitor 27 is connected to a reference terminal within the comparator 13 for providing the threshold voltage VCT. For instance, the comparator 13 is used as a compensated operational amplifier configured as a buffer. Hence, in the initialization phase, by closing the respective preset switches, the integration capacitor 27 respectively the integrator 12 can be preset to the threshold value VCT. Also in this case, a high accuracy can be achieved and a potential error at the beginning of the integration phase can be reduced.

In various configurations of such arrangement, where the photodiode 11 is connected to and disconnected from the integrator input 15, the switching process may provide additional current to the integrator input 15 that can have influence on the measurement result, for example during the residual measurement phase and the calibration phase.

Figure 7:
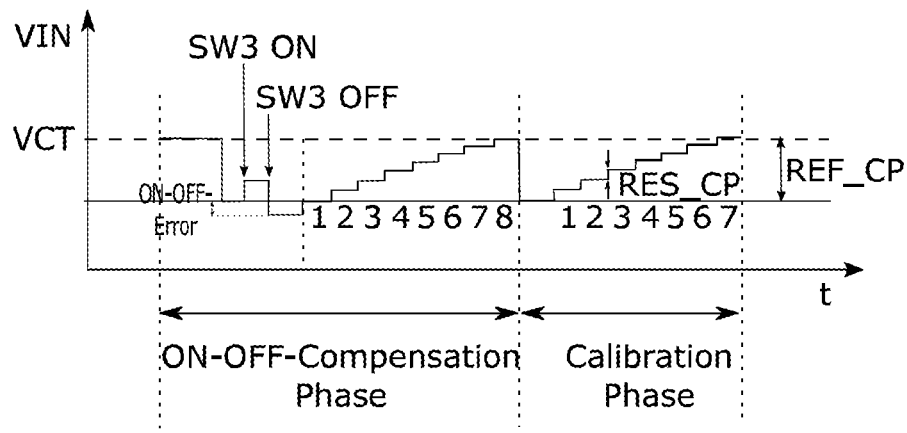
FIG. 7 shows a further example signal diagram of signals in the arrangement of FIG. 1.

To this end, the improved concept optionally introduces an ON-OFF-compensation phase during which the effects of connecting and disconnecting the photodiode are measured. An example implementation is shown in FIG. 7. For example, during the ON-OFF-compensation phase, the control unit 21 controls the reference charge circuit 14 to provide one of the first charge packages to the integrator input 15. Then the control unit 21 first connects and then disconnects, or vice versa, the photodiode 11 to respectively from the integrator input 15, which may result in an ON-OFF error. In the drawing, this is shown with controlling switch SW3 ON and OFF. Then the control unit 21 controls the reference charge circuit 14 to provide one or more of the second charge packages to the integrator input 15 until the comparison output changes. The control unit determines an ON-OFF number corresponding to the number of second charge packages provided, which in this example are eight second charge packages.

The ON-OFF-compensation phase may be implemented as a combination of a short integration phase that only allows switching on and off of the photodiode, together with a residual measurement phase, which provides the ON-OFF number in this case.

A difference between the reference number of the calibration phase, which is shown again in FIG. 7 but corresponds to the one shown in FIG. 2, and the ON-OFF number of the ON-OFF-compensation phase corresponds to the ON-OFF error. This numerical representation of the ON-OFF error can be taken into account when providing the total integration value, which then is further based on the ON-OFF number respectively the ON-OFF error.

It has further been found that also leakage currents can influence the measurement result. To take such leakage currents into account, the improved concept proposes to measure the leakage currents over a predefined time in terms of second charge packages. For example, the leakage current can be integrated for a full integration time respectively a regular integration phase, or a defined portion of such integration time. During such integration, the photodiode may be disconnected from the integrator input, or the photodiode may be connected without being exposed to light.

Figure 8:
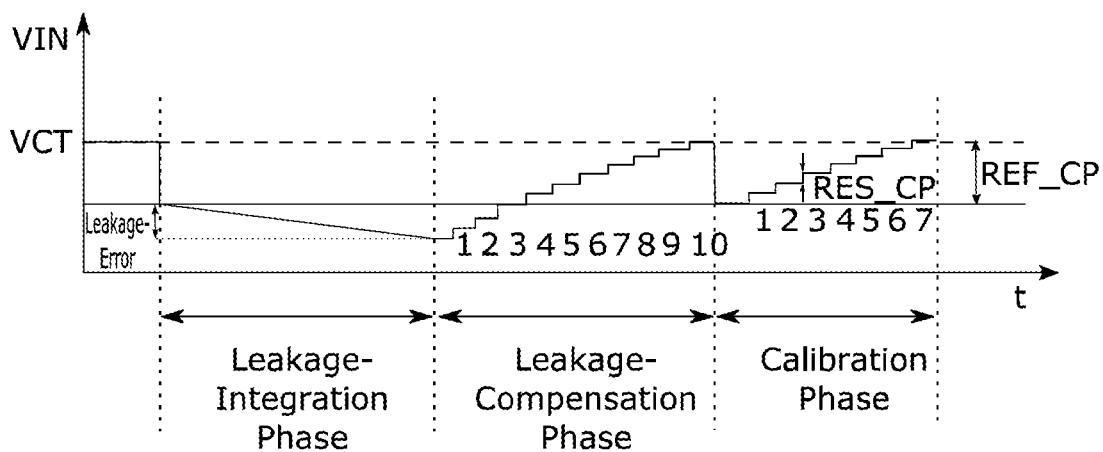
FIG. 8 shows a further example signal diagram of signals in the arrangement of FIG. 1.

For example, FIG. 8 shows an implementation example where the integration of the leakage current is performed during a leakage integration phase. After the leakage integration phase, a leakage compensation phase is started that more or less corresponds to a residual measurement phase, as for example shown in FIG. 2. Accordingly, the control unit 21 controls the reference charge circuit 14 to provide one or more of the second charge packages to the integrator input 15 until the comparison output changes, and determines a leakage number corresponding to the number of second charge packages provided during the leakage compensation phase, which is ten in the present example.

A difference between the reference number of the calibration phase and the leakage number of the leakage compensation phase corresponds to an internal error. This numerical representation of the internal error can be taken into account when providing the total integration value, which then is further based on the leakage number respectively the internal error. In particular, if the leakage integration phase has the same length as a regular integration phase, the difference value between the reference number and a leakage number can be directly used, assuming that the same leakage current would have been provided during a regular integration phase. However, if the leakage integration phase only lasts a portion of the regular integration phase, e.g. half the time, the difference should be formed from the leakage number multiplied with the ratio between regular integration time and the time of the leakage integration phase, which is two in the chosen example.

In order to be able to consider as well positive as negative leakage currents, one or more of the first charge packages could be provided to the integrator input 15 during the leakage integration phase, e.g. at the beginning of the leakage integration phase. Such first charge packages apparently have to be considered when determining the leakage number.

The invention claimed is:

1. An optical sensor arrangement comprising
an integrator with an integrator input and an integrator output;
a photodiode for providing a current corresponding to a first polarity;
a comparator with a comparator input coupled to the integrator output, the comparator being configured to compare a voltage at the comparator input with a threshold value for providing a comparison output;
a reference charge circuit that is coupled to the integrator input for selectively providing first charge packages of a first size or second charge packages of a second size, wherein the first charge packages correspond to a second polarity being opposite of the first polarity and the second charge packages correspond to the first polarity; and
a control unit that is configured
to, during a calibration phase, control the reference charge circuit to provide one of the first charge packages to the integrator input and to provide one or more of the second charge packages to the integrator input until the comparison output changes, and to determine a reference number corresponding to a number of the second charge packages provided;
to, during an integration phase, connect the photodiode to the integrator input, to control the reference charge circuit to provide one of the first charge packages to the integrator input in response to a respective change of the comparison output and to determine an integration number corresponding to a number of said changes of the comparison output; and
to, during a residual measurement phase that immediately follows the integration phase control the reference charge circuit to provide one or more of the second charge packages to the integrator input until the comparison output changes, and to determine a residual number corresponding to a number of the second charge packages provided.

2. The arrangement of claim 1, wherein the control unit is configured to provide a total integration value based on the integration number and a ratio of the residual number and the reference number.

3. The arrangement of claim 1, wherein the integration phase starts with providing one of the first charge packages to the integrator input.

4. The arrangement of claim 1, wherein the control unit is configured to, during an initialization phase that immediately precedes the integration phase, preset the integrator input to a voltage corresponding to the threshold value with a tolerance corresponding to less than the second size.

5. The arrangement of claim 4, wherein the control unit is configured to preset the integrator input during the initialization phase by charging an integration capacitor of the integrator to the threshold value.

6. The arrangement of claim 4, wherein the control unit is configured to preset the integrator input during the initialization phase by controlling the reference charge circuit to provide one or more of the first charge packages to the integrator input until the comparison output changes a first time, and controlling the reference charge circuit) to provide one or more of the second charge packages to the integrator input until the comparison output changes a second time.

7. The arrangement of claim 1, wherein
the reference charge circuit comprises a reference capacitor;
for providing the first charge package, the reference capacitor is charged with a first reference voltage while the reference capacitor is disconnected from the integrator input, and after the charging is connected to the integrator input; and
for providing the second charge package, the reference capacitor is charged with a second reference voltage while the reference capacitor is disconnected from the integrator input, and after the charging is connected to the integrator input.

8. The arrangement of claim 1, wherein
the reference charge circuit comprises a first and a second reference capacitor;
for providing the first charge package, the first reference capacitor is charged with a first reference voltage while the first reference capacitor is disconnected from the integrator input, and after the charging is connected to the integrator input; and
for providing the second charge package, the second reference capacitor is charged with the first reference voltage or with a second reference voltage while the second reference capacitor is disconnected from the integrator input, and after the charging is connected to the integrator input.

9. The arrangement of claim 7, wherein the charging and the provision of the first and second charge packages are based on a reference clock signal.

10. The arrangement of claim 9, wherein a clock speed of the reference clock signal is reduced during the calibration phase and/or the residual measurement phase, in particular compared to the integration phase.

11. The arrangement of claim 1, wherein an amplifier of the integrator is operated in a lower noise mode of operation during the calibration phase and/or the residual measurement phase, in particular compared to the integration phase.

12. The arrangement of claim 1, wherein the control unit is configured to enter the calibration phase more than once, and to determine a mean value from the respective reference numbers determined in each of said calibration phases, said mean value being used as a final reference number.

13. The arrangement of claim 1, wherein the first size of the first charge package is trimmed and the second size of the second charge package is not trimmed.

14. A light sensing method to be performed with an arrangement having a photodiode providing a current corresponding to a first polarity, an integrator with an integrator input and an integrator output, and a comparator with a comparator input coupled to the integrator output, the comparator being configured to compare a voltage at the comparator input with a threshold value for providing a comparison output, the method comprising:
during a calibration phase, provide one of first charge packages of a first size to the integrator input and provide one or more of second charge packages of a second size to the integrator input until the comparison output changes, and determine a reference number corresponding to a number of the second charge packages provided, wherein the first charge packages correspond to a second polarity being opposite of the first polarity and the second charge packages correspond to the first polarity;
during an integration phase, connect the photodiode to the integrator input, provide one of the first charge packages to the integrator input in response to a respective change of the comparison output and determine an integration number corresponding to a number of said changes of the comparison output; and
during a residual measurement phase that immediately follows the integration phase, provide one or more of the second charge packages to the integrator input until the comparison output changes, and to determine a residual number corresponding to a number of the second charge packages provided.

15. The method of claim 14, wherein during an initialization phase that immediately precedes the integration phase, the integrator input is preset to a voltage corresponding to the threshold value with a tolerance corresponding to less than the second size.

* * * * *